US012811979B2

(12) United States Patent
Ikeda

(10) Patent No.: US 12,811,979 B2
(45) Date of Patent: Nov. 24, 2026

(54) COMMUNICATION APPARATUS HAVING INSERTION DATA CONTROL, IMAGE GENERATION SYSTEM, CONTROL METHOD THEREOF, AND STORAGE MEDIUM

(71) Applicant: CANON KABUSHIKI KAISHA, Tokyo (JP)

(72) Inventor: Atsushi Ikeda, Kanagawa (JP)

(73) Assignee: CANON KABUSHIKI KAISHA, Tokoy (JP)

( * ) Notice: Subject to any disclaimer, the term of this patent is extended or adjusted under 35 U.S.C. 154(b) by 41 days.

(21) Appl. No.: 18/677,058

(22) Filed: May 29, 2024

(65) Prior Publication Data

US 2024/0430300 A1 Dec. 26, 2024

(30) Foreign Application Priority Data

Jun. 22, 2023 (JP) ................................ 2023-102573

(51) Int. Cl.

*H04L 9/40* (2022.01)
*G06F 3/0484* (2022.01)
*G06F 3/0487* (2013.01)

(52) U.S. Cl.

CPC .......... *H04L 63/1475* (2013.01); *H04L 63/04* (2013.01); *G06F 3/0484* (2013.01); *G06F 3/0487* (2013.01)

(58) Field of Classification Search

CPC ................. G06F 3/0484; G06F 3/0487; G06F 2221/031; G06F 3/0489; G06F 3/04895;

(Continued)

(56) References Cited

U.S. PATENT DOCUMENTS 8,589,797 B2 * 11/2013 Ichihara ............. H04N 1/00244 715/744
10,735,245 B2 8/2020 Ikeda (Continued)

FOREIGN PATENT DOCUMENTS

JP 2017-068693 A 4/2017

OTHER PUBLICATIONS

"Getting Started with Wordpress.com" Article dated May 26, 2022 as verified by Internet Archive (15 pages) https://web.archive.org/web/20220526122627/https://wordpress.com/support/getting-started-with-wordpress-com/ (Year: 2022).*

(Continued)

*Primary Examiner* — Amir Mehrmanesh
*Assistant Examiner* — Thomas A Gyorfi
(74) *Attorney, Agent, or Firm* — VENABLE LLP

(57) ABSTRACT

A communication apparatus accepts editing of insertion data to be inserted into an operation target element of a Web page and restricts transmission of the insertion data to an image generation system, that functions as a cloud browser, until editing of the insertion data is completed. A length of insertion data to be generated is controlled by switching between a character string mode that generates the insertion data as a character string and a key operation mode that generates the insertion data having a length of one character, in accordance with element information that includes attribute of the operation target element, and a length of insertion data to be generated is controlled to operate the communication apparatus in the key operation mode in a first case where the attribute is "text" or the attribute includes "auto-complete" and operate in the character string mode in a second case.

16 Claims, 14 Drawing Sheets

(58) Field of Classification Search
CPC ....... G06F 21/31; G06F 40/166; H04L 63/04; H04L 63/1475
See application file for complete search history.

(56) References Cited

U.S. PATENT DOCUMENTS

| | | | | |
|---|---|---|---|---|
| 2016/0259771 | A1* | 9/2016 | Sato | G06F 40/174 |
| 2021/0192818 | A1* | 6/2021 | Unami | G06T 11/60 |

OTHER PUBLICATIONS

"Posts" Article dated May 27, 2022 as verified by Internet Archive (16 pages) https://web.archive.org/web/20220527004544/https://wordpress.com/support/posts/ (Year: 2022).*
"Pages" Article dated May 27, 2022 as verified by Internet Archive (18 pages) https://web.archive.org/web/20220527034045/https://wordpress.com/support/pages/ (Year: 2022).*
"Post vs. Page" Article dated May 26, 2022 as verified by Internet Archive (8 pages) https://web.archive.org/web/20220526225128mp_/https://wordpress.com/support/post-vs-page/ (Year: 2022).*
"Use the Site Editor" Article dated May 26, 2022 as verified by Internet Archive (12 pages) https://web.archive.org/web/20220526122759/https://wordpress.com/support/site-editor/ (Year: 2022).*
"Wordpress Editor>>Add Content Using Blocks" Article dated May 26, 2022 as verified by Internet Archive (16 pages) https://web.archive.org/web/20220526161335mp_/https://wordpress.com/support/wordpress-editor/add-content-blocks/ (Year: 2022).*
"Wordpress Editor>>Customize Blocks" Article dated May 26, 2022 as verified by Internet Archive (14 pages) https://web.archive.org/web/20220526220800mp_/https://wordpress.com/support/wordpress-editor/customize-blocks/ (Year: 2022).*
"Wordpress Editor>>Block Error: Unexpected or Invalid Content" Article dated May 26, 2022 as verified by Internet Archive (11 pages) https://web.archive.org/web/20220526233811mp_/https://wordpress.com/support/wordpress-editor/block-error-unexpected-or-invalid-content/ (Year: 2022).*
"Settings>>Privacy Settings" Article dated May 26, 2022 as verified by Internet Archive (10 pages) https://web.archive.org/web/20220526122455mp_/https://wordpress.com/support/settings/privacy-settings/ (Year: 2022).*
"Block Editor Handbook" Article dated May 20, 2022 as verified by Internet Archive (5 pages) https://web.archive.org/web/20220520032857/https://developer.wordpress.org/block-editor/reference-guides/block-api/block-templates/#locking (Year: 2022).*
Wikipedia article for "WordPress" dated May 28, 2022 (21 pages) https://en.wikipedia.org/w/index.php?title=WordPress&oldid=1090325338 (Year: 2022).*
Wikipedia article for "WordPress.com" dated May 24, 2022 (4 pages) https://en.wikipedia.org/w/index.php?title=WordPress.com&oldid=1089566566 (Year: 2022).*

* cited by examiner

FIG. 5A

```
// NOTIFY INFORMATION OF USER OPERATION TO CLOUD AS POST DATA OF HTTPS COMMUNICATION
// AND INFORMATION OF ELEMENT WHICH USER PRESSED WILL BE RETURNED AS RESPONSE THERETO
var webclient= require("request");var webclient = require("request");
var userop = {type: click, x:50, y:20};
// COMMUNICATION REQUEST PROCESSING
webclient.post({
  url: "https://www.cloudbrowser.conon",
  headers: {
    "content-type": "application/json"
  },
  // NOTIFY THAT USER PRESSED (x, y)=(50,20) TO CLOUD.
  body: JSON.stringify(userop)
 }, function (error, response, body){
  // THIS BLOCK FIRES UPON RESPONSE FROM CLOUD.
});
```

FIG. 5B

```
// NOTIFY INFORMATION OF USER OPERATION TO CLOUD AS POST DATA OF HTTPS COMMUNICATION
// AND INFORMATION OF ELEMENT WHICH USER PRESSED WILL BE RETURNED AS THAT RESPONSE VAR WEBCLIENT = REQUIRE("REQUEST");
var webclient = require("request");
var userop = {type: insert, text: ABC};
// COMMUNICATION REQUEST PROCESSING
webclient.post({
  url: "https://www.cloudbrowser.conon",
  headers: {
    "content-type": "application/json"
 },
 // NOTIFY THAT INSERTION DATA IS CHARACTER STRING ABC TO CLOUD.
 body: JSON.stringify(userop)
}, function (error, response, body){
  // THIS BLOCK FIRES UPON RESPONSE FROM CLOUD.
});
```

FIG. 6A

```
If (tagName == "input" &&; typeName == "text") {
        // PROCESSING OF EDITABLE ELEMENT
}
```

FIG. 6B

```
/// SET COORDINATES THAT USER PRESSED AS (x, y)
var element = document.getElementFromPoint(x, y);
var tagName = element.tagName;
var typeName = element.type;
```

FIG. 6C

```
var targetElement = document.activeElement;
targetElement.value = "ABC";
```

FIG. 8A

```
// NOTIFY INFORMATION OF USER OPERATION TO CLOUD AS POST DATA OF HTTPS COMMUNICATION
// AND INFORMATION OF ELEMENT WHICH USER PRESSED WILL BE RETURNED AS THAT RESPONSE
var webclient = require("request");
var userop = {type: insert, text: ABCDEFGHIJKLMNOPQRSTUVWXYZ};
// COMMUNICATION REQUEST PROCESSING
 webclient.post({
   url: "https://www.cloudbrowser.conon",
   headers: {
      "content-type": "application/json"
 },
// NOTIFY THAT INSERTION DATA IS TEXT STRING ABCDEFGHIJKLMNOPQRSTUVWXYZ TO CLOUD.
body: JSON.stringify(userop)
}, function (error, response, body){
    // THIS BLOCK FIRE WHEN THERE IS RESPONSE FROM CLOUD.
});
```

FIG. 8B

```
// NOTIFY INFORMATION OF USER OPERATION TO CLOUD AS post DATA OF HTTPS COMMUNICATION
// AND INFORMATION OF ELEMENT WHICH USER PRESSED WILL BE RETURNED AS THAT RESPONSE
var webclient = require("request");
var userop = {type: insert, image: "data:image/jpeg;base64,/9j/4AAQSkZ..."};
// COMMUNICATION REQUEST PROCESSING
   url: "https://www.cloudbrowser.conon",
   headers: {
      "content-type": "application/json"
 },
// NOTIFY CLOUD THAT INSERTION DATA IS IMAGE REPRESENTED IN BASE 64 FORM.
body: JSON.stringify(userop)
   //THIS BLOCK FIRES UPON RESPONSE FROM CLOUD.
});
```

FIG. 12

DECISION TABLE FOR INSERTION DATA EDITING TOOL

| VALUE OF type ATTRIBUTE | INSERTION DATA EDITING TOOL |
|---|---|
| color | COLOR SELECTION GRAPHICAL USER INTERFACE |
| date | DATE SELECTION GRAPHICAL USER INTERFACE |
| email | SOFTWARE KEYBOARD FOR INPUTTING MAIL ADDRESS |
| file | FILE SELECTION GRAPHICAL USER INTERFACE |
| image | IMAGE SELECTION GRAPHICAL USER INTERFACE |
| number | SOFTWARE KEYBOARD FOR INPUTTING NUMBER |
| password | SOFTWARE KEYBOARD FOR INPUTTING PASSWORD |
| text | NORMAL SOFTWARE KEYBOARD |

FIG. 14A
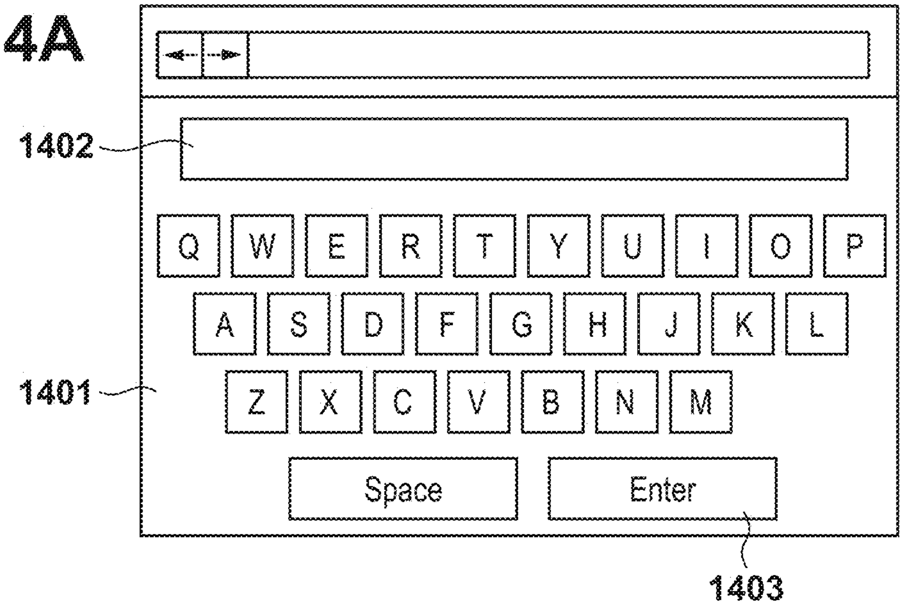
FIG. 14B
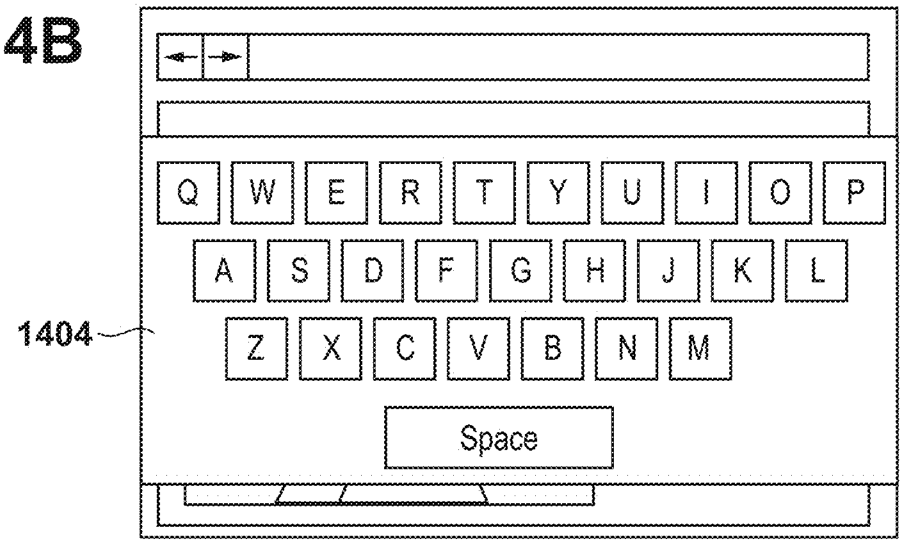
FIG. 15
DECISION TABLE FOR KEY OPERATION MODE
| ELEMENT INFORMATION | INSERTION DATA TRANSMISSION MODE |
|---|---|
| VALUE OF type ATTRIBUTE IS text | KEY OPERATION MODE |
| THERE IS autocomplete ATTRIBUTE | KEY OPERATION MODE |
| OTHER | CHARACTER STRING MODE |

COMMUNICATION APPARATUS HAVING INSERTION DATA CONTROL, IMAGE GENERATION SYSTEM, CONTROL METHOD THEREOF, AND STORAGE MEDIUM

BACKGROUND OF THE INVENTION

Field of the Invention

The present invention relates to a communication apparatus, an image generation system, a control method thereof, and a storage medium.

Description of the Related Art

Currently, communication apparatuses, which are equipped with a Web browser (referred to as browser in the following) and have a function that enables Web page browsing on the browser, are widely used. By displaying a Web page of an external service via the browser, the communication apparatus can cooperate with the external service.

The processing performed by the browser also includes processing of inserting characters into the Web page in response to key operation by a user. For example, when a login page for logging in the Web service is displayed, the user performs a key operation on the communication apparatus to input an ID and a password of the user.

Currently, the browser may be configured in a thin-client form that is one kind of configuration of the browser. Specifically, the functions of the browser are separated into a dedicated viewer and an image generation system. And then, the dedicated viewer is operated on the communication apparatus on a side of the user, and the image generation system is operated on a remote server. A communication apparatus on a side of the user transmits an operation instruction of the user to the remote server. And, the remote server transmits a processing result of the image generation system to the communication apparatus on a side of the user, and then the communication apparatus on a side of the user presents the received processing result to the user by using the dedicated viewer.

The configuration in which the image generation system operates on the remote server is referred to as a cloud browser. The cloud browser executes processing, which has a high computation load such as parsing processing or execution processing of a Web page, in the image generation system on the server, to relieve the communication apparatus of the computation load.

Here, Japanese Patent Laid-Open No. 2017-68693 discloses that a server refers to a suppression definition file of key operations when the server receives a key code from a communication apparatus, and the server discards the key operation when the received key code is a target of suppression, or the server permits the key operation when the key code is not the target of suppression.

However, there is a possibility in the technology described in Japanese Patent Laid-Open No. 2017-68693 that the ID or the password of the user may be estimated from the number of times of communication in a case where an image generation system exists between the communication apparatus and the external Web service as with the cloud browser. Specifically, there is a possibility that the number of key inputs is estimated from the number of communication times between the communication apparatus and the image generation system, allowing a third party to identify the number of characters included in the ID or the password.

SUMMARY OF THE INVENTION

The present invention, which has been made in view of the above problems, provides a technology for avoiding from the third party estimating the ID or the password of the user.

According to one aspect of the present invention, there is provided a communication apparatus configured to receive and display a rendering result of a Web page from an image generation system that functions as a cloud browser, the communication apparatus comprising: an editing unit configured to accept editing of insertion data to be inserted into an operation target element of the Web page; and a control unit configured to restrict transmission of the insertion data to the image generation system until editing of the insertion data is completed.

Further features of the present invention will become apparent from the following description of exemplary embodiments (with reference to the attached drawings).

BRIEF DESCRIPTION OF THE DRAWINGS

FIG. 5A and FIG. 5B are diagrams illustrating examples in which processing on a side of the communication apparatus according to an embodiment is implemented by a program;

FIG. 6A, FIG. 6B and FIG. 6C are diagrams illustrating examples of programs on a side of the communication apparatus and on a side the image generation system, according to an embodiment;

FIG. 8A and FIG. 8B are diagrams illustrating examples in which processing on a side of a communication apparatus according to a modification of the first embodiment is implemented by a program;

FIG. 12 is a diagram illustrating an example of a decision table for an insertion data editing tool according to the second embodiment;

FIG. 14A and FIG. 14B are diagrams illustrating display examples of a software keyboard according to a modification of the second embodiment; and FIG. 15 is a diagram illustrating an example of a decision table for a key operation mode according to a modification of the second embodiment.

DESCRIPTION OF THE EMBODIMENTS

Figure 1:
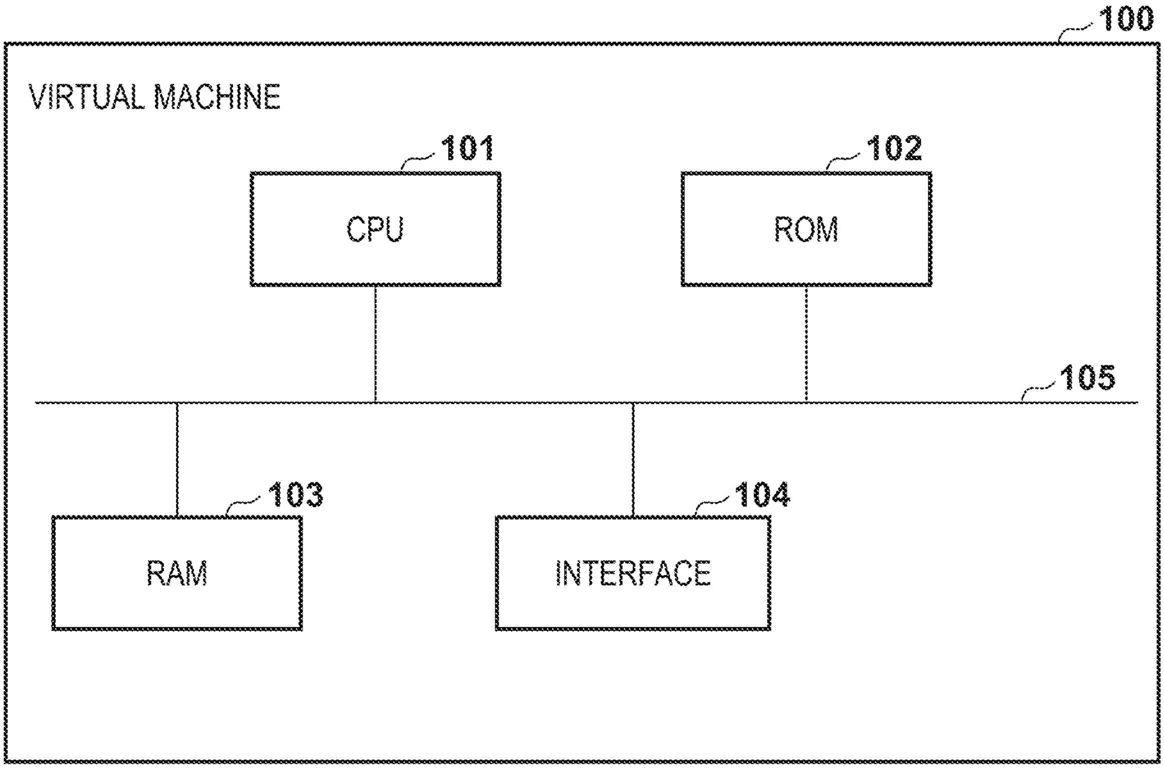
FIG. 1 is a diagram illustrating an example of a hardware configuration of a virtual machine according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the present embodiment, a case where an editable element exists on a Web page that is browsed by a cloud browser will be described. In the present embodiment, a character string generated on a communication apparatus is transmitted at a time, instead of transmitting key operation information from a communication apparatus to an image generation system at each operation of a keyboard. In addition, an element that can be edited may be referred to as an "editable element" in the present embodiment. Furthermore, an element to be operated by a user may be referred to as an "operation target element".

<Configuration of Virtual Machine>

First, a configuration of a virtual machine according to the present embodiment will be described, referring to a block diagram of FIG. 1. A virtual machine generally refers to a computer in which same functions as those provided by a physical computer are implemented by software. The virtual machine is created on a physical hardware system, and the virtual machine may include a Central Processing Unit (CPU), a memory, an interface, storage or the like, which are dedicated to the virtual machine.

In FIG. 1, reference sign 101 indicates a CPU that controls a virtual machine 100 as a whole. A reference sign 102 indicates a Read Only Memory (ROM) that stores programs and parameters which need not be changed. A reference sign 103 indicates a Random Access Memory (RAM) that temporarily stores programs and data supplied from an external apparatus or the like. A reference sign 104 indicates an interface configured to display data being held or data being supplied. A reference sign 105 indicates a system bus that connects each unit of 101 to 104 so that they are able to communicate with each other.

The virtual machine 100 may include, for example, an interface with a pointing device such as a mouse or an input device such as a keyboard that are configured to receive an operation from a user to input data. In addition, the virtual machine 100 may also include a hard disk or a memory card virtually and stationary installed to the virtual machine 100. In addition, the virtual machine 100 may include an external storage apparatus and the like, which is configured to be virtually attached to or detached from the virtual machine 100, and includes a Flexible Fisk (FD), an optical disk such as a Compact Disk (CD), a magnetic or optical card, an IC card, a memory card, or the like. Furthermore, the virtual machine 100 may include a network interface or the like configured to connect to a network line such as the Internet.

<System>

Figure 2:
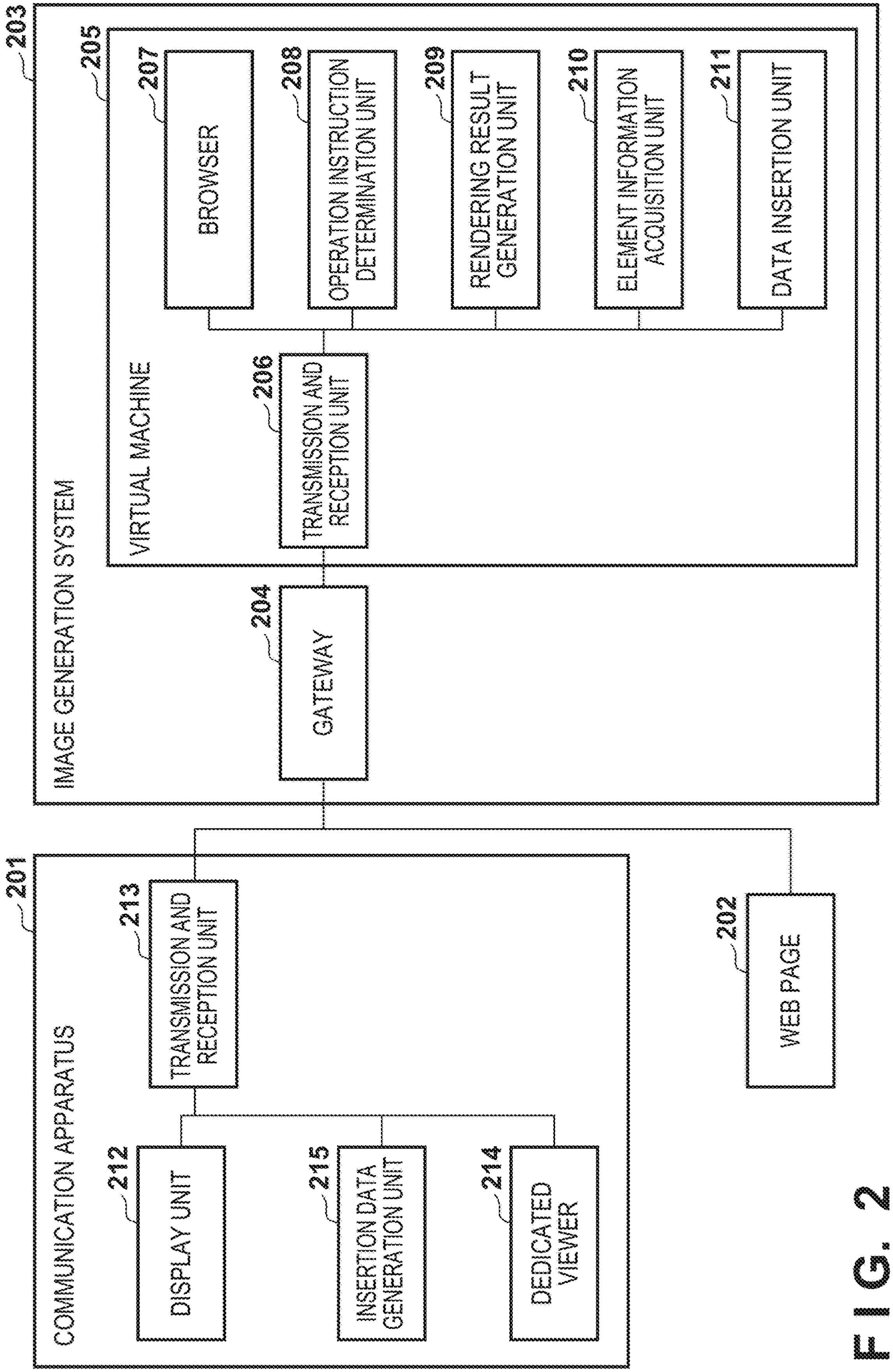
FIG. 2 is a diagram illustrating a configuration example of an image generation system and a communication apparatus according to the first embodiment.

Next, a configuration of a cloud browser according to an embodiment will be described, referring to FIG. 2. FIG. 2 is a diagram illustrating a configuration example of an image generation system and a communication apparatus according to a first embodiment. In FIG. 2, reference sign 201 indicates the communication apparatus. In addition, reference sign 203 indicates an image generation system. In the present embodiment, the image generation system functions as the cloud browser.

The communication apparatus 201 includes a display unit 212, a transmission and reception unit 213, a dedicated viewer 214, and an insertion data generation unit 215. The image generation system 203 includes a gateway 204 and a virtual machine 205. The virtual machine 205 includes a transmission and reception unit 206, a browser 207, an operation instruction determination unit 208, a rendering result generation unit 209, an element information acquisition unit 210, and a data insertion unit 211. The virtual machine 205 has the hardware configuration of the virtual machine 100 illustrated in FIG. 1.

The user browses a screen of the display unit 212 in the communication apparatus 201. The communication apparatus 201 transmits a URL of the Web page 202, for which the user intended to browse, to the image generation system 203 via the transmission and reception unit 213. In addition, the insertion data generation unit 215 of the communication apparatus 201 generates insertion data to be inserted into the Web page 202, and transmits the insertion data to the image generation system 203 via the transmission and reception unit 213.

Here, the transmission and reception unit 213 of the communication apparatus 201 performs encrypted communication with the image generation system 203 in accordance with an encrypted communication protocol. In this case, the encrypted communication protocol may employ Secure Socket Layer (SSL) or Transport Layer Security (TLS).

Next, the image generation system 203 uses the URL received from the communication apparatus 201 to access the Web page 202 via the transmission and reception unit 206. The rendering result generation unit 209 of the image generation system 203 generates a rendering result, which is a result of rendering the Web page 202. Next, in a case where the image generation system 203 receives an acquisition request for a rendering result from the communication apparatus 201, the image generation system 203 transmits the generated rendering result to the communication apparatus 201 via the transmission and reception unit 206.

The communication apparatus 201 receives the rendering result via the transmission and reception unit 213, and transfers the received rendering result to the dedicated viewer 214. The dedicated viewer 214 presents the rendering result to the user via the display unit 212.

Here, the browser 207 that generates the rendering result operates on the virtual machine 205. The browser 207 is a so-called browser engine, which executes parsing of HTML, JavaScript (trade name), CSS or the like, or processing associated with user operations or communication events. Communication between the communication apparatus 201 and the virtual machine 205, and communication between the server (not illustrated) that provides the Web page 202 and the virtual machine 205 are performed via the gateway 204.

The virtual machine 205 operates the browser 207, based on the operation instruction of the user received from the communication apparatus 201. The operation instruction may include pressing on a screen, proceeding, returning, screen enlargement, or the like. The type of operation instruction is determined by the operation instruction determination unit 208.

In a case where the operation instruction is pressing on a screen, the element information acquisition unit 210 acquires element information and transmits the element information to the communication apparatus 201 via the transmission and reception unit 206. The element information may include at least one of a name of operation target element, an attribute name assigned to operation target element, and a value of an attribute assigned to operation target element, according to the operation instruction of the user. In addition, in a case where insertion data is received from the communication apparatus 201 via the transmission and reception unit 206, the data insertion unit 211 inserts the insertion data into the operation target element that is pressed immediately before.

Figure 3:
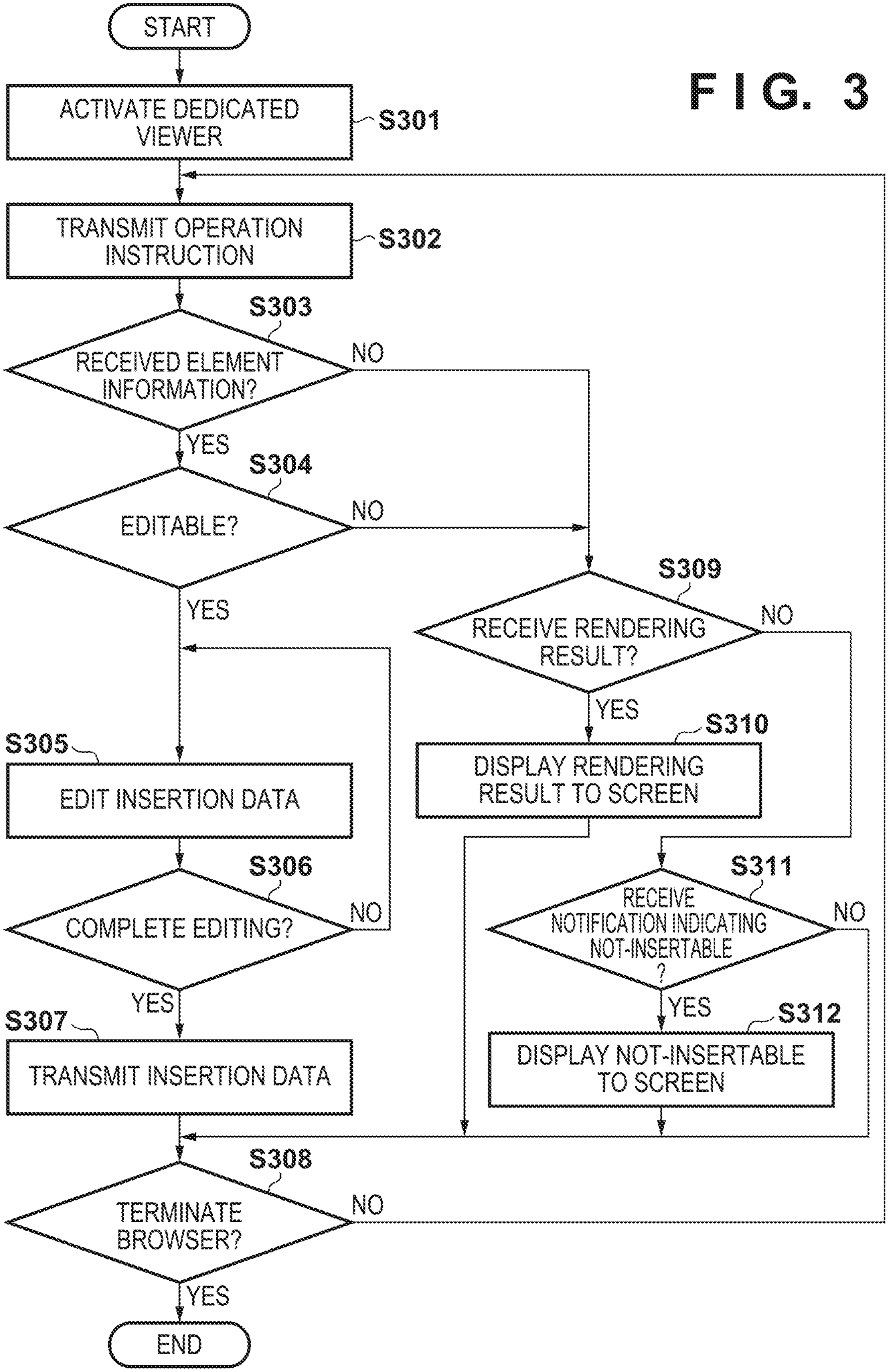
FIG. 3 is a flowchart illustrating a processing flow of the communication apparatus according to the first embodiment.
Figure 4:
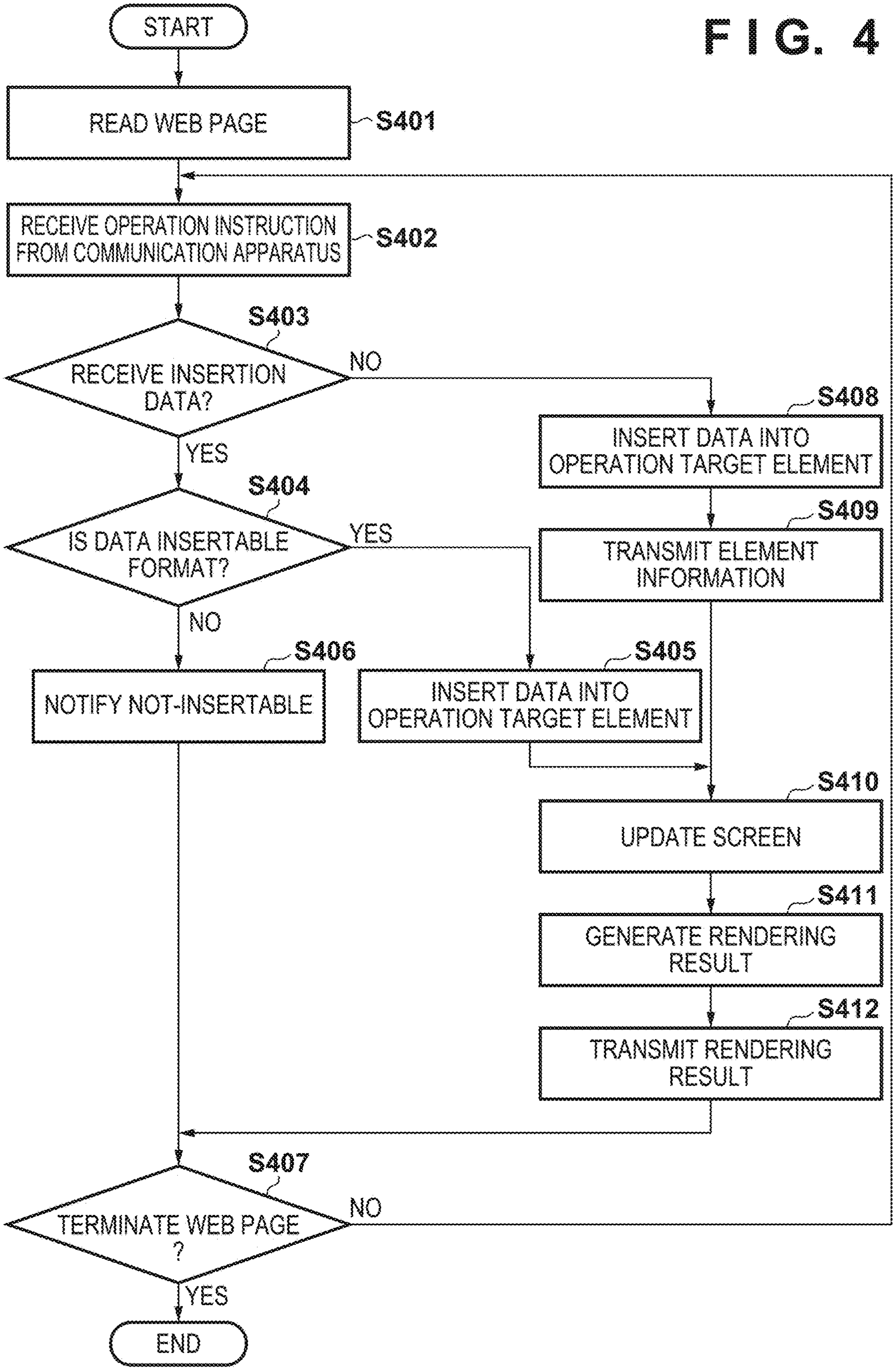
FIG. 4 is a flowchart illustrating a processing flow of the image generation system according to the first embodiment.

Next, processing according to the present embodiment will be described, referring to FIG. 3 and FIG. 4. FIG. 3 is a flowchart illustrating a procedure of processing to be performed by the communication apparatus 201 according to the present embodiment, and FIG. 4 is a flowchart illustrating a procedure of processing to be performed by the image generation system 203 according to the present embodiment.

<Processing of Communication Apparatus>

First, processing of the communication apparatus 201 will be described, referring to FIG. 3. In S301, the communication apparatus 201 activates the dedicated viewer 214. Next, in S302, the transmission and reception unit 213 transmits an operation instruction to the image generation system 203.

Here, an example of a method of transmitting an operation instruction of a user from the communication apparatus 201 to the image generation system 203 in S302 of FIG. 3 will be described with referring to FIG. 5A. FIG. 5A is a JavaScript program that stores a user operation instruction in a BODY of HTTP communication. "webclient" in FIG. 5A is a structure for transmitting an HTTP communication request to the communication destination. In addition, "userop" is a structure for storing an operation instruction of a user, and a value thereof is {type:click, x:50, y:20}. "type: click" indicates that the user operation is a click. Other values that may be taken by "type" include "insert", "datacopy", or the like, for example. "insert" indicates insertion of data into the operation target element. "datacopy" indicates processing of copying the Web page configuration information at a position where the user is operating to the shared memory of the communication apparatus 201. Here, "x:50" indicates that the user intends to operate the x coordinate of 50, and "y:20" indicates that the user intends to operate the y coordinate of 20.

The transmission processing can be performed by "webclient.post( )". The request destination can be specified by a "url" member, the value of which is, for example, "https://www.cloudbrowser.canon". In addition, "body" of the request can be specified by a body member, the value of which is "userop". The content of the instruction can be recognized at the image generation system 203 side by referring to "userop" received from the communication apparatus 201.

Next, in S303, the communication apparatus 201 uses the dedicated viewer 214 to determine whether or not element information is received. In a case where element information is received, the processing proceeds to S304. On the other hand, in a case where element information is not received, the processing proceeds to S309.

In S304, the communication apparatus 201 refers to the element information using the dedicated viewer 214 and determines whether or not the operation target element is an editable element. In a case where the operation target element is an editable element, the processing proceeds to S305. On the other hand, in a case where the operation target element is not an editable element, the processing proceeds to S309.

Here, details of the determination method in S304 will be described, referring to FIG. 6A. FIG. 6A is an example of a program for recognizing whether or not the element is an editable element. In FIG. 6A, "tagName" indicates a name of the element (element name) included in the element information, and "typeName" indicates a value of the "type" attribute included in the element information. The "if" statement in FIG. 6A determines whether or not the name of the element is "input", and the "type" attribute is "text". An "input" element having "type" attribute being "text" is an element to which the user can input an arbitrary character string. Therefore, in a case where the "if" statement in FIG. 6A is true, the element information can be determined to be editable.

In the present embodiment, an example is described that determination of being editable is based on the element name being "input" and the "type" attribute being "text", determination of being editable may be based on the element name being "textarea". In addition, determination of being editable may be based on a "contenteditable" attribute assigned to an arbitrary element being "true".

Figure 7A:
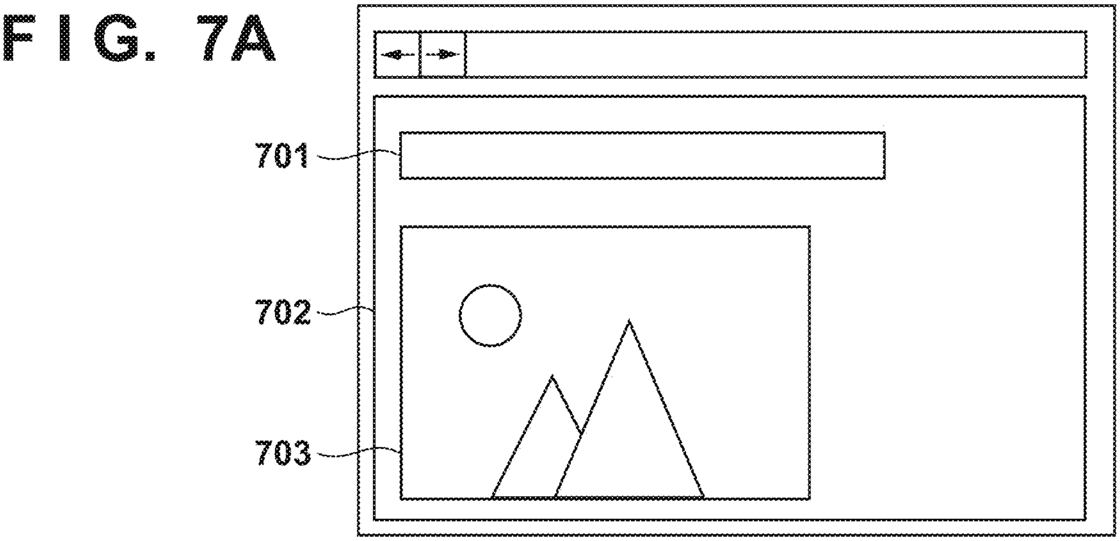
FIG. 7A, FIG. 7B and FIG. 7C are diagrams illustrating display examples of a dedicated viewer according to the first embodiment.
Figure 7B:
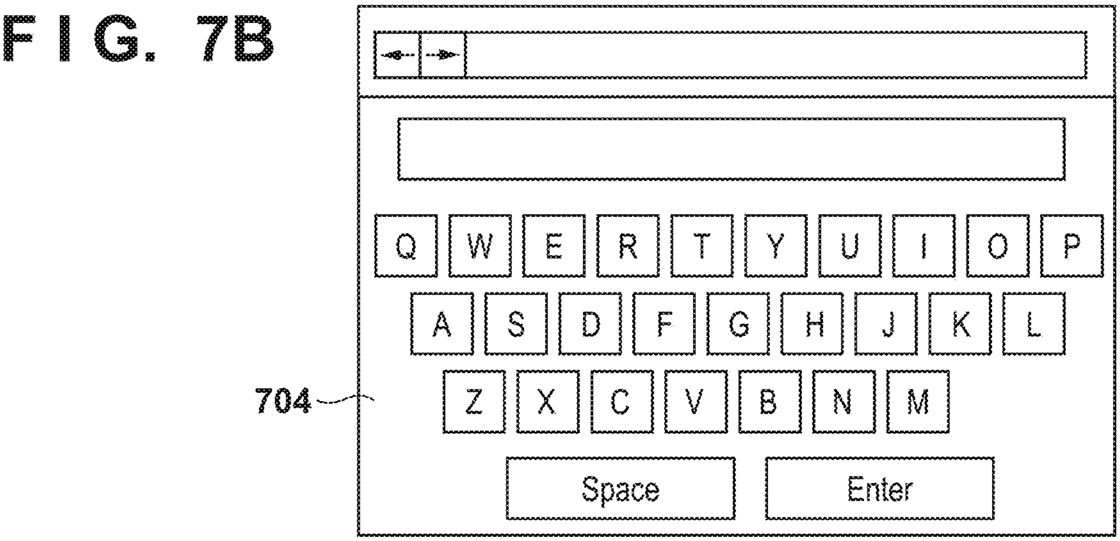

In S305, the insertion data generation unit 215 starts and executes editing of data to be inserted. At the present step, editing can be accepted based on input by the communication apparatus 201. In S306, the insertion data generation unit 215 determines whether or not editing of the data to be inserted is completed. Here, an example of a case where editing of data to be inserted is completed is a case in which the user presses a completion button of a software keyboard when the user is using the software keyboard on the communication apparatus 201. Pressing of an "Enter" button is accepted as an editing completion instruction. For example, the "Enter" button illustrated in FIG. 7B is an example of a completion button. When the editing is completed, the processing proceeds to S307. On the other hand, in a case where the editing is not completed, the processing returns to S305. As such, control is performed to restrict transmission of insertion data to the image generation system 203 until the editing of the insertion data is completed. In S307, the transmission and reception unit 213 transmits the insertion data to the image generation system 203.

Here, another example of the method of transmitting the operation instruction of the user from the communication apparatus 201 to the image generation system 203 in S302 of FIG. 3 will be described, referring to FIG. 5B. FIG. 5B is a diagram illustrating a JavaScript program that stores insertion data in the BODY of HTTP communication. The value of "userop" in FIG. 5B is {type:insert, text:ABC}. "type:insert" indicates insertion of data. "text:ABC" indicates that the insertion data is a character string having a value of "ABC".

Figure 7C:
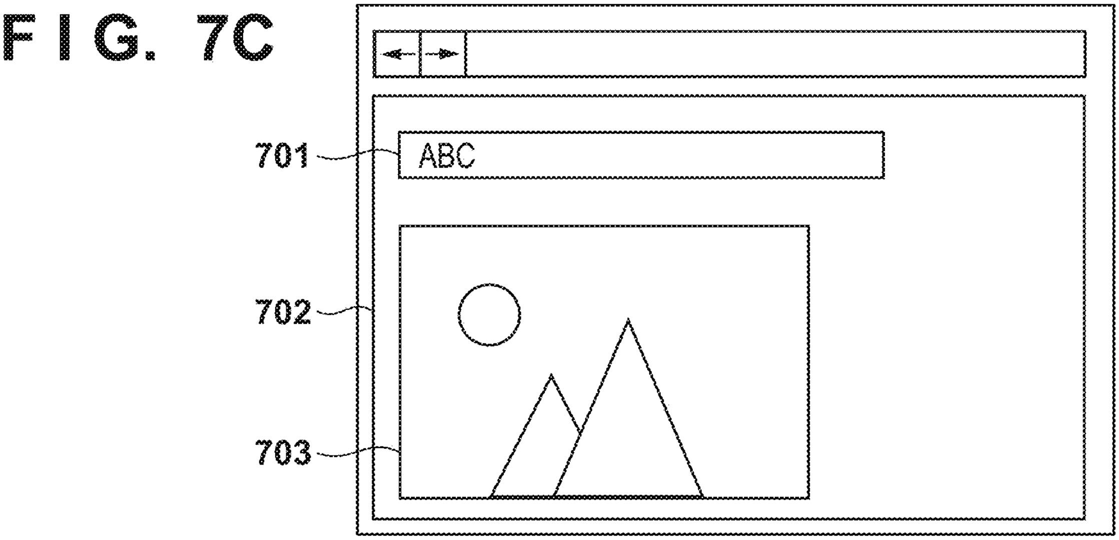

Here, a display example in the display unit 212 of the communication apparatus 201 will be described, referring to FIG. 7A to FIG. 7C. FIG. 7A is a diagram illustrating a display example of the dedicated viewer 214. A reference sign 701 indicates an input element on a Web page. A reference sign 702 indicates the Web page. A reference sign 703 indicates an image on the Web page. Here, it is assumed that the Web page 702 is depicting the entire rendering result, and the input element 701 and the image 703 are included in the rendering result. In a case where the user presses the input element 701 on the dedicated viewer 214, the processing proceeds to S305, because the result of the determination processing in S304 indicates that the operation target element is an editable element.

The dedicated viewer 214 at the communication apparatus 201 side activates the software keyboard in S305. In such a case, the display result on the screen becomes as illustrated in FIG. 7B. In FIG. 7B, reference sign 704 indicates the software keyboard. In this case, it is assumed that the user has pressed in order of key "A", key "B", key "C" and "Enter" key as the keyboard input operation. In such a case, the insertion data generation unit 215 generates a character string "ABC". Furthermore, the transmission and reception unit 213 transmits the character string "ABC" to the image generation system 203 as insertion data. In the present embodiment, description has been provided assuming that the keyboard operated by the user is a software keyboard, the keyboard may be a hardware keyboard on which physical operation is performed.

Next, the data insertion unit 211 at the image generation system 203 side inserts the character string "ABC" received from the communication apparatus 201 into the input element 701. In such a case, appearance of the Web page 202 changes as in FIG. 7C.

Next, the communication apparatus 201 determines in S308 whether or not the user has terminated the use of the cloud browser. In a case where use of the cloud browser is terminated, the processing is terminated. On the other hand, in a case where the use of the cloud browser is to be continued, the processing returns to S302 and the processing is repeated. In S309, the communication apparatus 201 determines whether or not a rendering result is received via the transmission and reception unit 213. In a case where the rendering result is received, the processing proceeds to S310. On the other hand, in a case where the rendering result is not received, the processing proceeds to S311.

Figure 9A:
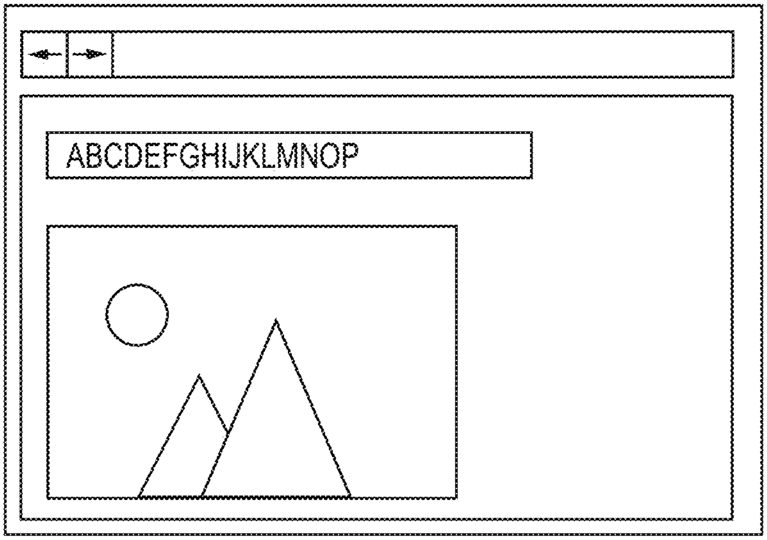
FIG. 9A is a diagram illustrating a display example of a character string according to a modification of the first embodiment.
Figure 9B:
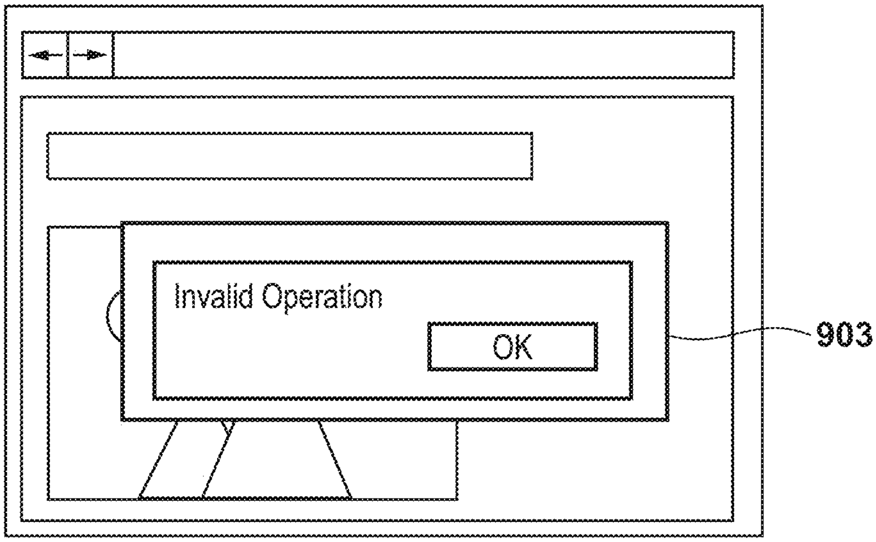
FIG. 9B is a diagram illustrating a display example of a notification indicating not-insertable according to the first embodiment.

In S310, the communication apparatus 201 displays the rendering result in the display unit 212. In S311, the communication apparatus 201 determines whether or not a notification indicating not-insertable is received from the image generation system 203. In a case where a notification indicating not-insertable is received, the processing proceeds to S312. On the other hand, in a case where a notification indicating not-insertable is not received, the processing proceeds to S308. In S312, the display unit 212 of the communication apparatus 201 displays, on the screen, indicating that data is not-insertable. Here, a notification example of display indicating not-insertable in S312, referring to FIG. 9B. FIG. 9B is a result of the display by the display unit 212 indicating not-insertable. A reference sign 903 indicates a graphical user interface that notifies the user that insertion data is failed to be inserted into the editable element. The series of processing in FIG. 3 thus ends.

<Processing of Image Generation System>

First, a processing flow at the image generation system 203 side according to the present embodiment will be described, referring to FIG. 4. In S401, the image generation system 203 reads a Web page based on the URL of the Web page notified from the communication apparatus 201.

In S402, the image generation system 203 receives the operation instruction of the user notified from the communication apparatus 201 via the transmission and reception unit 206. The information of the operation instruction of the user includes information indicating an attribute of operation such as "tap" that touches the screen of the communication apparatus 201 with a finger, or "key input" that presses a keyboard installed in the communication apparatus 201. In addition, information of the operation instruction of the user also includes information attached (assigned) for each attribute of operation, such as x and y coordinates indicating the location where the user has touched on the screen, and the value of the key pressed by the user. The URL of the Web page or the operation instruction pass through the gateway 204 and reach the browser 207 via the transmission and reception unit 206.

In S403, the image generation system 203 determines whether or not insertion data is received from the communication apparatus 201 via the transmission and reception unit 206. In a case where the insertion data is received from the communication apparatus 201, the processing proceeds to S404. On the other hand, in a case where the insertion data is not received from the communication apparatus 201, the processing proceeds to S408.

In S404, the data insertion unit 211 of the image generation system 203 determines whether or not the received insertion data is in a format that is insertable into the operation target element. In a case where the insertion data is in the format that is insertable, the processing proceed to S405. On the other hand, in a case where the insertion data is not in the format that is insertable, the processing proceeds to S406.

In S405, the data insertion unit 211 of the image generation system 203 inserts the data into the operation target element. Next, details of the processing method of S405 will be described, referring to FIG. 6C. FIG. 6C is an example of a JavaScript program for inserting insertion data into an operation target element. "document.activeElement" is a JavaScript function that returns an operation target element. A character string can be inserted into an operation target element by storing the character string "ABC" in the value of the "value" attribute of the operation target element identified by "document.activeElement".

Note that, in a case where a part of the insertion data is insertable whereas other parts are not-insertable, only the insertable character string may be extracted and inserted. In a case where, for example, a character string "A1B2C3" is inserted into an element having a name of "input" and having "type" of "number", the insertion data may be determined to be in the format that is insertable, and only the insertable character string "123" may be inserted. Subsequently, the processing proceeds to S410.

In S406, the transmission and reception unit 206 of the image generation system 203 notifies the communication apparatus 201 that it is not-insertable. A type of character that can be input to the element of a Web page may be restricted. Example of the restriction may be such that only numerals are accepted. An element that accepts only numerals is represented by the element name of "input" and the "type" of "number". Alternatively, a notification indicating not-insertable may be transmitted when at least a part of the insertion data is not-insertable.

Here, a case where a user uses a general PC browser or a browser on a smartphone will be described. When the user presses the key of alphabet "A" with respect to an element having a name of "input" and "type" of "number", nothing is displayed. When, on the other hand, the user presses the key of numeral "1" on an element having a name of "input" and "type" of "number", "1" is input to the "input" element.

In S407, the image generation system 203 determines whether or not the user has terminated the use of the Web page. In a case where the user has terminated the use of the Web page, the processing is terminated. On the other hand, in a case where the user has not terminated the use of the Web page, the processing returns to S402 and the processing is repeated.

In S408, the transmission and reception unit 211 of the image generation system 203 notifies the browser 207 of the user operation instruction. In S409, the element information acquisition unit 210 of the image generation system 203 acquires the element information of the operation target element, and transmits the element information to the communication apparatus 201.

Here, details of the acquisition method of the element information will be described, referring to FIG. 6B. FIG. 6B is an example of a JavaScript program for acquiring element information exists at user-pressed coordinates. "document-.getElementFromPoint (x, y)" is a function for extracting an element at x and y coordinates. The element that exists at the position (x, y) where the user has pressed is obtained by this function. In addition, "element.tagName" indicates a name of the element, and "element.type" indicates a value of the "type" attribute. As such, element information can be acquired by using the program of FIG. 6B.

Subsequently, in S410, the browser 207 of the image generation system 203 updates the screen. In S411, the rendering result generation unit 209 of the image generation system 203 generates a rendering result. In S412, the transmission and reception unit 211 of the image generation system 203 transmits the rendering result generated in S411 to the communication apparatus 201. And then, the processing proceeds to S407. The series of processing in FIG. 4 thus ends.

In the present embodiment, as has been described above, control is performed to restrict transmission of insertion data from the communication apparatus 201 to the image generation system 203 until editing of insertion data to be inserted into an operation target element is completed. More specifically, a character string generated on the communication apparatus is transmitted at a time, instead of transmitting key operations from the communication apparatus to the image generation system at each operation of the keyboard. Accordingly, the risk in the cloud browser that an ID or a password of the user is estimated from the number of key operations, i.e., the number of communication times can be avoided.

Modification of First Embodiment

In the present modification, a case where insertion data cannot be inserted as it is into an editable element will be described.

FIG. 8A is a JavaScript program that stores insertion data in the BODY of HTTP communication. The difference between FIG. 5A and FIG. 8A is the insertion data specified by "userop". The insertion data in FIG. 5A is the character string "ABC", whereas the insertion data in FIG. 8A is a character string "ABCDEFGHIJKLMNOPQRSTUVWXYZ".

Here, assuming that the rendered width of the character string "ABCDEFGHIJKLMNOPQRSTUVWXYZ" is wider than the width of the input element 701 illustrated in FIG. 7A. In such a case, the data insertion unit 211 of the image generation system 203 inserts, into the input element 701, as many characters as fit into the width of the input element 701 from the head of the character string "ABCDEFGHIJKLMNOPQRSTUVWXYZ", in S305 in FIG. 3. In this case, the appearance of the Web page becomes as FIG. 9A. As such, in a case where insertion data of a length that cannot be inserted into the operation target element is received, an insertion data subset that is cut out from the insertion data by insertable length from the head of the insertion data is inserted into the operation target element.

Additionally, in a case where a maximum number of characters that can be input is specified for the input element 701, the data insertion unit 211 may insert as many as the maximum number of characters that can be input from the head of the character string "ABCDEFGHIJKLMNOPQRSTUVWXYZ". For example, in a case where the maximum number of characters that can be input to the input element 701 is five, the data insertion unit 211 may insert a character string "ABCDE" into the input element 701.

Second Embodiment

In the present embodiment, a case where the communication apparatus changes the insertion data editing tool (a plurality types of graphical user interfaces, a plurality types of software keyboards) depending on the element information will be described. In the present embodiment, the element information includes a "type" attribute, and the insertion data editing tool is changed depending on the value thereof. Here, the system configuration and the apparatus configuration are similar to those of the first embodiment, and therefore description thereof will be omitted.

<Processing>

Figure 10:
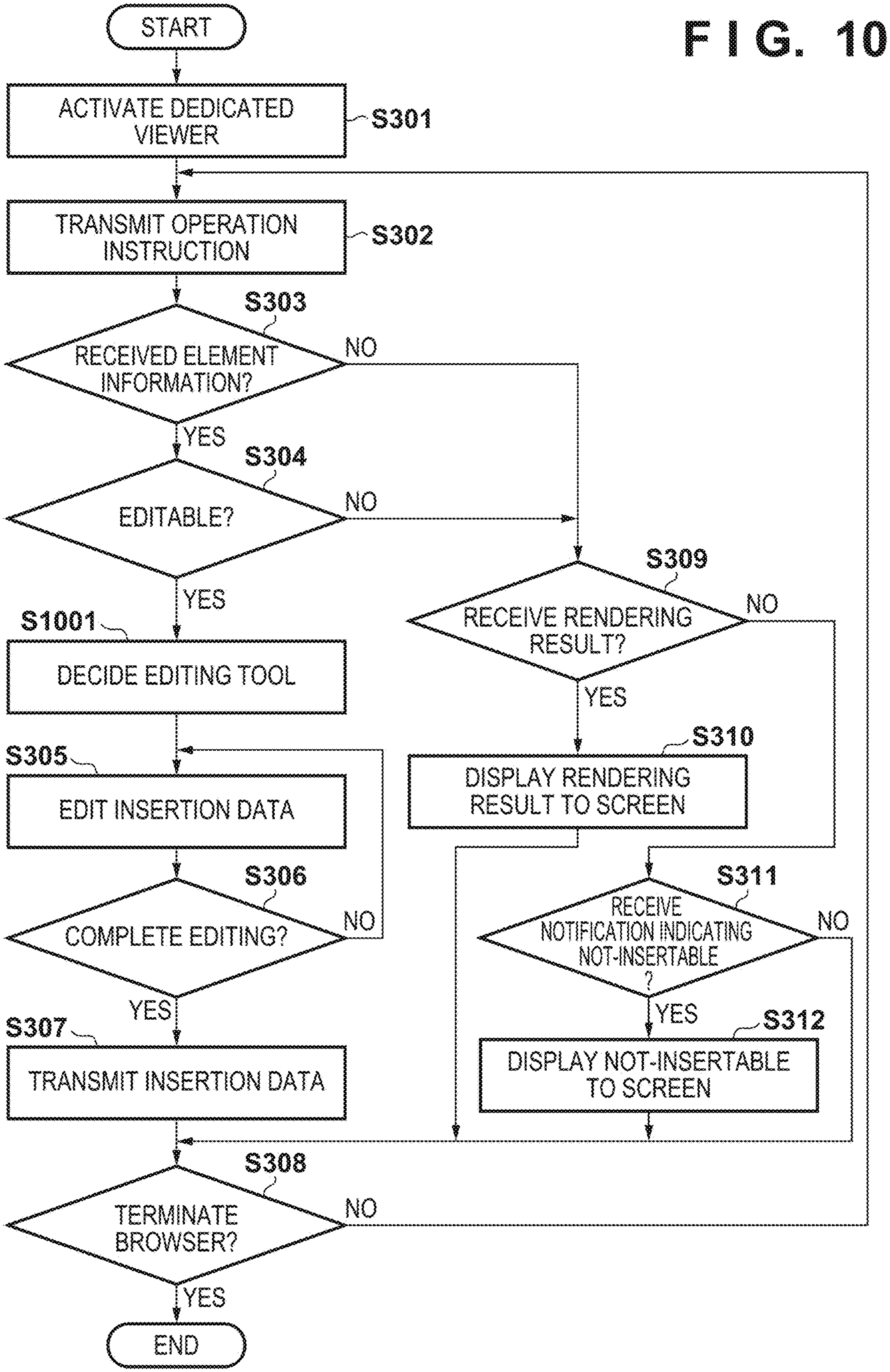
FIG. 10 is a flowchart illustrating a processing flow of a communication apparatus according to a second embodiment.

FIG. 10 is a diagram illustrating a processing flow at the communication apparatus 201 side according to the present embodiment. In the present embodiment, the processing flow at the image generation system 203 side is similar to the processing flow of FIG. 4. The difference between FIG. 10 and FIG. 3 is that the processing S1001 is present in FIG. 10. In a case where the operation target element is an editable element as the result of determination in S304, the insertion data generation unit 215 decides in S1001 an insertion data editing tool and activates the insertion data editing tool being decided.

Here, one of the insertion data editing tools of the communication apparatus 201 is a software keyboard for inputting a password. When the software keyboard for inputting a password is used, the password is replaced with asterisks "*" such that the password displayed on the screen is not visually recognized by a third party in inputting the password. In addition, other forms of the insertion data editing tools include a color selection graphical user interface, a software keyboard for inputting mail address, an image selection graphical user interface, or the like.

Here, FIG. 12 is a diagram illustrating an example of a decision table for an insertion data editing tool representing a correspondence relation between values of "type" attributes included in the element information and insertion data editing tools respectively corresponding to the values of "type" attributes. In a case where the value of the "type" attribute is "password", for example, the insertion data editing tool is a software keyboard for inputting a password. In the present embodiment, the mode of the insertion data editing tool, which is activated in generating insertion data, is changed by referring to the decision table for the insertion data editing tool in FIG. 12.

Figure 11A:
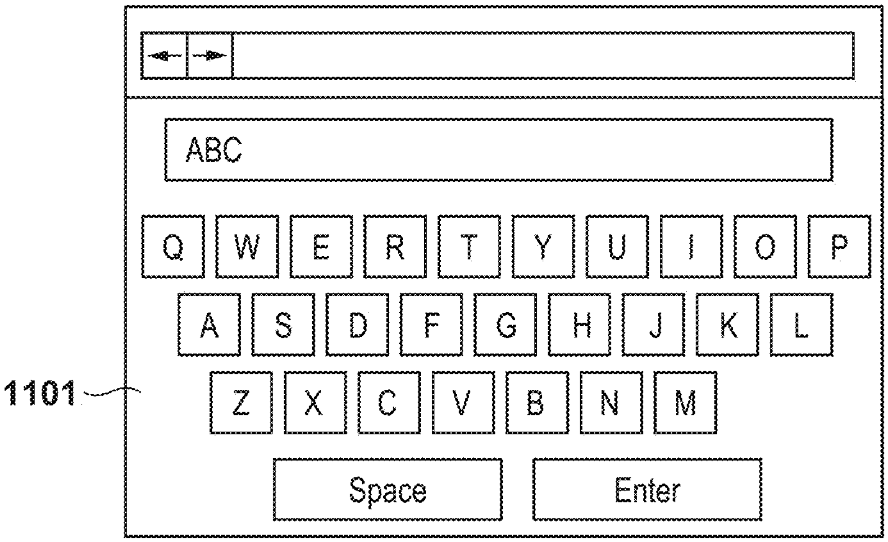
FIG. 11A and FIG. 11B are diagrams illustrating a change in the form of an insertion data editing tool according to the second embodiment.
Figure 11B:
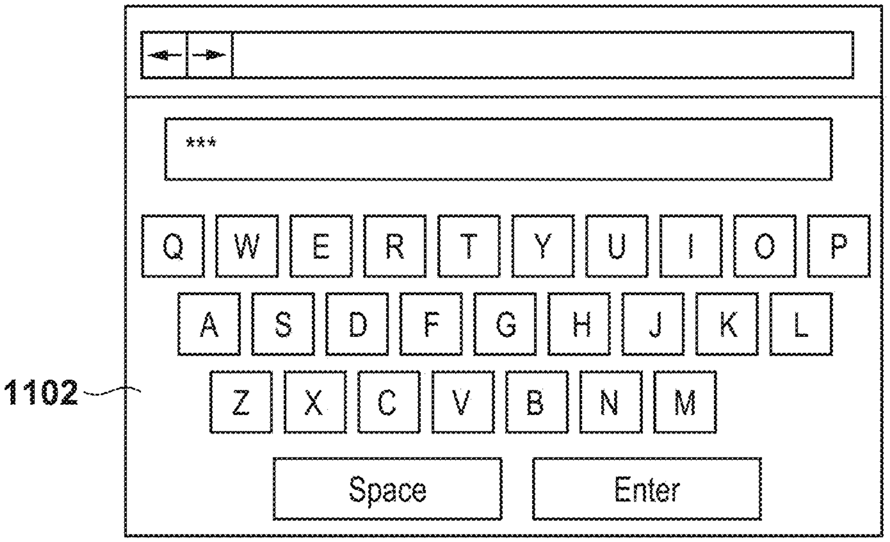

In addition, FIG. 11A and FIG. 11B are diagrams illustrating a difference between a regular software keyboard and the software keyboard for inputting a password, according to the second embodiment. The regular software keyboard is a keyboard 1101 illustrated in FIG. 11A. On the other hand, the software keyboard for inputting a password is a keyboard 1102 illustrated in FIG. 11B.

As can be seen from the keyboard 1102, the character string input by the user is replaced by asterisks "*", and thus the risk of the password being visually recognized by the third party from behind the user is avoided. The password characters are replaced by asterisks "*" in the present embodiment, the password characters may be replaced with any character other than asterisks "*"

In the present embodiment, as has been described above, the form or the like of the software keyboard is switched depending on element information. The foregoing allows for further improving the security in generating insertion data.

Modification of Second Embodiment

In the present modification, a case where the communication apparatus changes the length of insertion data to be generated in accordance with element information will be described. Specifically, a character string mode that generates the insertion data as a character string and a key operation mode that generates the insertion data having a length of one character are switched. Here, in the key operation mode, the communication apparatus operates such that the insertion data is transmitted to the image generation system character by character.

<Processing>

Figure 13:
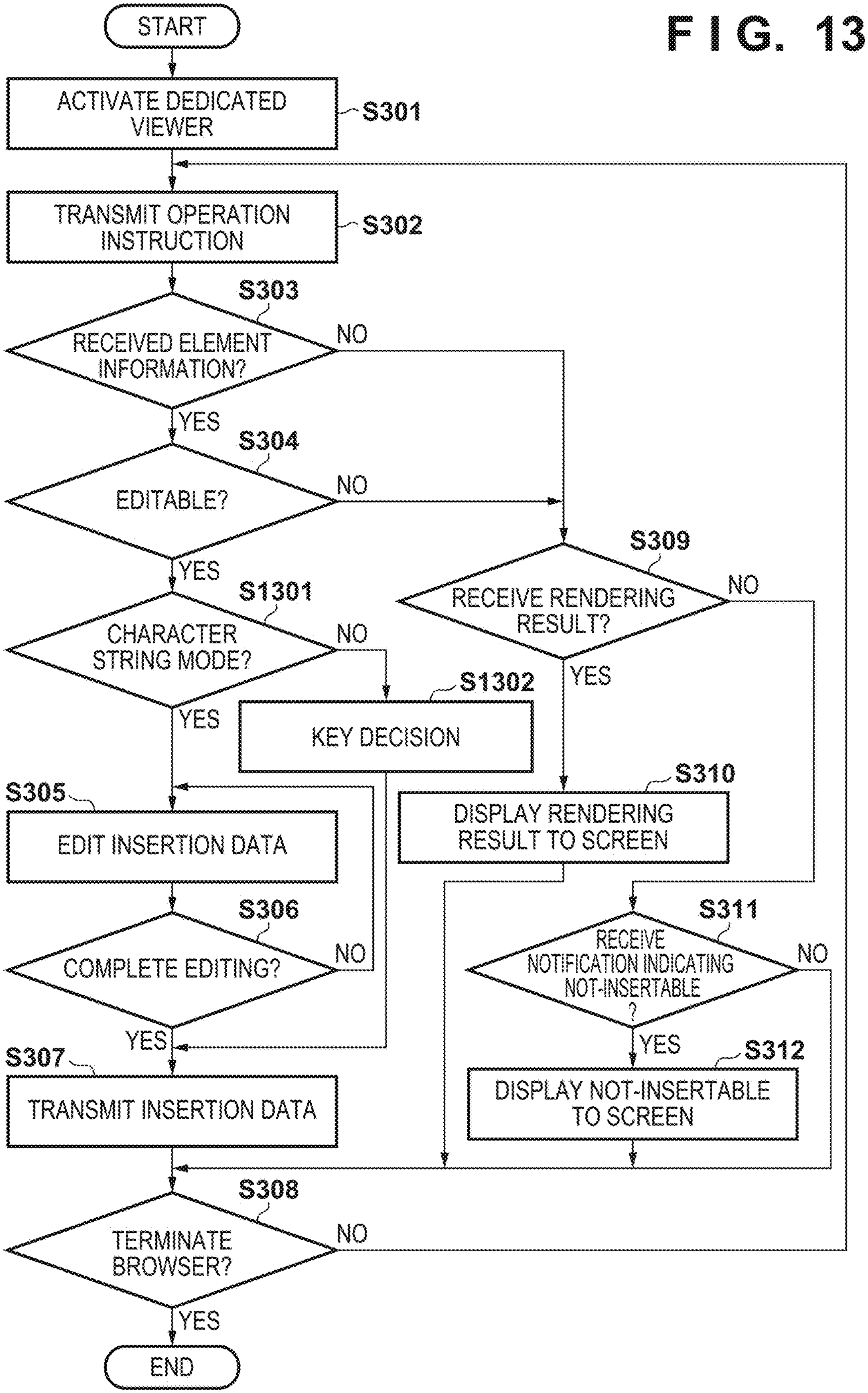
FIG. 13 is a flowchart illustrating a processing flow of the communication apparatus according to a modification of the second embodiment.

FIG. 13 is a diagram illustrating a processing flow performed at the communication apparatus 201 side according to the present modification. The difference between FIG. 3 and FIG. 13 is that the processing S1301 and the processing S1302 are present in FIG. 13.

In the present embodiment, the insertion data generation unit 215 determines in S1301 whether or not to generate the insertion data in the character string mode, in a case where the operation target element is an editable element as the result of determination in S304. In a case where it is determined that the insertion data is generated in the character string mode, the insertion data generation unit 215 generates the insertion data in the character string mode in S305 and S306. On the other hand, in a case where it is determined that the insertion data is not generated in the character string mode, the processing proceeds to S1302.

Here, FIG. 15 is a diagram illustrating an example of a decision table for a key operation mode representing a correspondence relation between contents of the element information and insertion data transmission modes respectively corresponding to the contents of the element information. The insertion data transmission mode indicates which mode, the character string mode or the key operation mode, is used to generate the insertion data. According to FIG. 15, in a case where an "autocomplete" attribute is included in the element information as the attribute name, complementation of the input character string is recommended for that element. The reason is to achieve the purpose of the "autocomplete" function.

The "autocomplete" function of the browser, which is set for the purpose of supporting the user for inputting, presents input candidates predicted from the past input history or the like. In order to present input candidates, the browser needs to handle the user operation character by character. Therefore, in the present modification, the user operation instruction is transmitted character by character by using the key operation mode, in a case where the element information includes the "autocomplete" attribute as the attribute name. According to FIG. 15, the key operation mode is also used in a case where the value of the "type" attribute in the element information is "text". The character string mode is used in other cases.

In S1302, the insertion data generation unit 215 generates the insertion data in the key operation mode. More specifically, the insertion data generation unit 215 decides the key pressed by the user. Subsequently, the processing proceeds to S307. In S307, the communication apparatus 201 transmits information of the key being decided in S1302 to the image generation system 203.

Here, a display example of the software keyboard in the character string mode according to the present modification and a display example of the software keyboard in the key operation mode are compared and described, referring to FIG. 14A and FIG. 14B. A keyboard 1401 illustrated in FIG. 14A is a display example of the software keyboard in the character string mode. In addition, a field 1402 is a field in which a character string input via the software keyboard is displayed, and a button 1403 is a button for accepting that editing of insertion data is completed. On the other hand, a keyboard 1404 illustrated in FIG. 14B is a display example of the software keyboard in the key operation mode. The field 1402 such as that illustrated in FIG. 14A does not exist in the keyboard 1404, because the user operation instruction is notified to the image generation system 203 immediately after a key is pressed.

In the present modification, as has been described above, control is performed such that the transmission illustrated in S305 to S306 is not restricted, in a case where the element information includes a predetermined attribute (e.g., "autocomplete" or the like). Specifically, it is designed such that the insertion data is generated character by character under a particular condition. Accordingly, the Web content in which behavior changes for each character being input, such as the "autocomplete" function, can be supported.

Here, description has been provided in the embodiments described above assuming that the insertion data is a character string, the present invention is not limited thereto. The insertion data may be a numeral string or a combination of characters and numerals. In addition, the insertion data may be an image. The insertion data may include at least one of the foregoing items.

According to the present invention, it becomes possible to avoid from the third party estimating the ID or the password of the user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-102573, filed Jun. 22, 2023, which is hereby incorporated by reference herein in its entirety.

What is claimed is:

1. A communication apparatus configured to receive and display a rendering result of a Web page from an image generation system that functions as a cloud browser, the communication apparatus comprising:

a memory containing instructions and a processor for executing the instructions to operate as:

an editing unit configured to accept editing of insertion data to be inserted into an operation target element of the Web page; and a control unit configured to restrict transmission of the insertion data to the image generation system until editing of the insertion data is completed, wherein the control unit changes a length of insertion data to be generated by switching between a character string mode that generates the insertion data as a character string and a key operation mode that generates the insertion data having a length of one character, in accordance with element information that includes attribute of the operation target element, and wherein the control unit changes a length of insertion data to be generated by performing control such that the communication apparatus operates in the key operation mode in a first case where a type of the attribute is "text" or the attribute includes "autocomplete" and by performing a control such that the communication apparatus operates in the character string mode in a second case.

2. The communication apparatus according to claim 1, further comprising execution of the instructions to operate as:

a transmission unit configured to transmit an operation instruction of the Web page to the image generation system;

a reception unit configured to receive, from the image generation system, the element information of the operation target element to be operated by the operation instruction; and a determination unit configured to determine whether or not the operation target element is editable, based on the element information, wherein the determination unit determines the operation target element is editable in a case where a type of the attribute is "text" or the attribute includes "autocomplete," and the editing unit accepts editing of the insertion data in a case where the operation target element is editable.

3. The communication apparatus according to claim 2, further comprising a display configured to display information indicating that the insertion data is not-insertable to the operation target element, in a case where a notification indicating that the insertion data is not-insertable is received from the image generation system.

4. The communication apparatus according to claim 2, further comprising execution of the instructions to operate as a decision unit configured to decide an editing tool of the insertion data based on the element information, in a case where the operation target element is editable, wherein the editing unit accepts editing of the insertion data using the editing tool decided by the decision unit.

5. The communication apparatus according to claim 4, wherein the editing tool is one of a plurality types of graphical user interfaces or a plurality types of software keyboards.

6. The communication apparatus according to claim 2, wherein the control unit does not restrict the transmission in a case where the element information includes a predetermined attribute.

7. The communication apparatus according to claim 6, wherein the predetermined attribute is an "autocomplete" attribute.

8. The communication apparatus according to claim 1, further comprising execution of the instructions to operate as an acceptance unit configured to accept an instruction indicating that editing of the insertion data is completed.

9. The communication apparatus according to claim 1, wherein the insertion data includes at least one of a character string, a numeral string, and an image.

10. An image generation system that functions as a cloud browser, the image generation system comprising:

a memory containing instructions and a processor for executing the instructions to operate as:

an acquisition unit configured to acquire element information including an attribute of an operation target element of a Web page;

a transmission unit configured to transmit the element information to a communication apparatus;

a reception unit configured to receive, from the communication apparatus, insertion data to be inserted into the operation target element of the Web page, the insertion data being generated by the communication apparatus by switching between a character string mode that generates the insertion data as a character string and a key operation mode that generates the insertion data having a length of one character, in accordance with the element information including the attribute of the operation target element;

a determination unit configured to determine whether or not the insertion data is in a format that is insertable into the operation target element; and an insertion unit configured to insert the insertion data into the operation target element, in a case where the insertion data is in a format that is insertable, wherein the insertion data received from the communication apparatus is generated in the key operation mode in a first case where a type of the attribute is "text" or the attribute includes "autocomplete" and is generated in the character string mode in a second case.

11. The image generation system according to claim 10, further comprising execution of the instructions to operate as a notification unit configured to notify the communication apparatus that the insertion data cannot be inserted into the operation target element, in a case where the insertion data is not in the format that is insertable.

12. The image generation system according to claim 10, wherein, in a case where insertion data of a length that cannot be inserted into the operation target element is received, the insertion unit inserts, into the operation target element, an insertion data subset that is cut out from the insertion data by insertable length from the head of the insertion data.

13. A control method of a communication apparatus configured to receive and display a rendering result of a Web page from an image generation system that functions as a cloud browser, the control method comprising:

editing in which editing of insertion data to be inserted into an operation target element of the Web page is accepted; and controlling in which transmission of the insertion data to the image generation system is restricted until editing of the insertion data is completed, wherein a length of insertion data to be generated is controlled by switching between a character string mode that generates the insertion data as a character string and a key operation mode that generates the insertion data having a length of one character, in accordance with element information that includes attribute of the operation target element, and wherein a length of insertion data to be generated is controlled to operate the communication apparatus in the key operation mode in a first case where a type of the attribute is “text” or the attribute includes “autocomplete” and controlled to operate the communication apparatus in the character string mode in a second case.

14. A method of controlling an image generation system that functions as a cloud browser, the method comprising:

acquiring element information including an attribute of an operation target element of a Web page;

transmitting the element information to a communication apparatus;

receiving, from the communication apparatus, insertion data to be inserted into the operation target element of a Web page, the insertion data being generated by the communication apparatus by switching between a character string mode that generates the insertion data as a character string and a key operation mode that generates the insertion data having a length of one character, in accordance with the element information including the attribute of the operation target element;

determining whether or not the insertion data is in a format that is insertable into the operation target element; and inserting the insertion data into the operation target element, in a case where the insertion data is in a format that is insertable, wherein the insertion data received from the communication apparatus is generated in the key operation mode in a first case where a type of the attribute is “text” or the attribute includes “autocomplete” and is generated in the character string mode in a second case.

15. A non-transitory computer-readable storage medium storing a program for causing a computer to execute a method of controlling a communication apparatus configured to receive and display a rendering result of a Web page from an image generation system that functions as a cloud browser, the method comprising:

editing in which editing of insertion data to be inserted into an operation target element of the Web page is accepted; and controlling in which transmission of the insertion data to the image generation system is restricted until editing of the insertion data is completed, wherein a length of insertion data to be generated is controlled by switching between a character string mode that generates the insertion data as a character string and a key operation mode that generates the insertion data having a length of one character, in accordance with element information that includes attribute of the operation target element, and wherein a length of insertion data to be generated is controlled to operate the communication apparatus in the key operation mode in a first case where a type of the attribute is “text” or the attribute includes “autocomplete” and controlled to operate the communication apparatus in the character string mode in a second case.

16. A non-transitory computer-readable storage medium storing a program for causing a computer to execute a method of controlling an image generation system that functions as a cloud browser, the method comprising:

acquiring element information including an attribute of an operation target element of a Web page;

transmitting the element information to a communication apparatus;

receiving, from the communication apparatus, insertion data to be inserted into the operation target element of the Web page, the insertion data being generated by the communication apparatus by switching between a character string mode that generates the insertion data as a character string and a key operation mode that generates the insertion data having a length of one character, in accordance with the element information including the attribute of the operation target element;

determining whether or not the insertion data is in a format that is insertable into the operation target element; and inserting the insertion data into the operation target element, in a case where the insertion data is in a format that is insertable, wherein the insertion data received from the communication apparatus is generated in the key operation mode in a first case where a type of the attribute is “text” or the attribute includes “autocomplete” and is generated in the character string mode in a second case.

* * * * *